US011636602B1

United States Patent
Havír et al.

(10) Patent No.: US 11,636,602 B1
(45) Date of Patent: Apr. 25, 2023

(54) PRELABELING FOR SEMANTIC SEGMENTATION TASKS

(71) Applicant: Scale AI, Inc., San Francisco, CA (US)

(72) Inventors: Daniel Havír, San Francisco, CA (US); Chiao-Lun Cheng, San Francisco, CA (US); Elliot Branson, San Francisco, CA (US); Nathan Herman, San Francisco, CA (US); Nathan Hayflick, San Francisco, CA (US); Simon Alexander Hewat, Danville, CA (US); Suchir Balaji, Berekley, CA (US); Shariq Hashme, San Francisco, CA (US)

(73) Assignee: SCALE AI, INC., San Francisco, CA (US)

( * ) Notice: Subject to any disclaimer, the term of this patent is extended or adjusted under 35 U.S.C. 154(b) by 206 days.

(21) Appl. No.: 16/789,318

(22) Filed: Feb. 12, 2020

(51) Int. Cl.
*G06T 7/11* (2017.01)
*G06N 20/00* (2019.01)
*G06T 7/136* (2017.01)

(52) U.S. Cl.
CPC ............ *G06T 7/11* (2017.01); *G06N 20/00* (2019.01); *G06T 7/136* (2017.01); *G06T 2200/24* (2013.01); *G06T 2207/20081* (2013.01)

(58) Field of Classification Search
CPC . G06T 7/11; G06T 7/136; G06T 2207/20081; G06T 2200/24; G06N 20/00
See application file for complete search history.

(56) References Cited

U.S. PATENT DOCUMENTS

| 10,839,530 | B1* | 11/2020 | Berger | G06N 3/0445 |
| 11,055,819 | B1* | 7/2021 | Singh | G06N 3/0454 |
| 11,070,763 | B2* | 7/2021 | Hoevenaar | H04N 1/00127 |
| 11,122,238 | B1* | 9/2021 | van Amersfoort | G06N 3/088 |
| 2018/0315165 | A1* | 11/2018 | Navarrete Michelini | G06N 3/0454 |
| 2019/0045168 | A1* | 2/2019 | Chaudhuri | G06T 7/55 |
| 2019/0251612 | A1* | 8/2019 | Fang | G06F 16/532 |

(Continued)

FOREIGN PATENT DOCUMENTS

| WO | WO 2021144230 A1 * | 1/2020 | G06N 3/04 |
| WO | WO 2021144230 A1 * | 7/2021 | G06N 3/04 |
| WO | WO-2021144230 A1 * | 7/2021 | |

OTHER PUBLICATIONS

L. Li, H. Fu and C. -L. Tai, "Fast Sketch Segmentation and Labeling With Deep Learning," in IEEE Computer Graphics and Applications, vol. 39, No. 2, pp. 38-51, Mar. 1-Apr. 2019, doi: 10.1109/MCG.2018.2884192.*

(Continued)

*Primary Examiner* — Asghar H Bilgrami
(74) *Attorney, Agent, or Firm* — Artegis Law Group, LLP (57) ABSTRACT

One embodiment of the present invention sets forth a technique for performing a labeling task. The technique includes generating a multi-scale representation of an image as input to a machine learning model. The technique also includes performing one or more operations that apply the machine learning model to the multi-scale representation of the image to produce a semantic segmentation comprising predictions of labels for regions of pixels in the image. The technique further includes outputting, in a user interface, the semantic segmentation for use in assisting a user in specifying the labels for the pixels in the image.

19 Claims, 6 Drawing Sheets

(56) References Cited

U.S. PATENT DOCUMENTS

| | | | | |
|---|---|---|---|---|
| 2019/0347771 | A1* | 11/2019 | Suszek | G06T 7/194 |
| 2019/0355103 | A1* | 11/2019 | Baek | G06N 3/088 |
| 2020/0126185 | A1* | 4/2020 | Choi | G06T 3/4046 |
| 2020/0193609 | A1* | 6/2020 | Dharur | G06T 7/11 |
| 2020/0250398 | A1* | 8/2020 | Courtiol | G06K 9/0014 |
| 2020/0302225 | A1* | 9/2020 | Dutta | G16B 40/20 |
| 2021/0006782 | A1* | 1/2021 | Ramchandran | H04N 19/59 |
| 2021/0082118 | A1* | 3/2021 | Zhang | G06N 3/084 |
| 2021/0174513 | A1* | 6/2021 | Chidlovskii | G06N 3/08 |
| 2021/0196434 | A1* | 7/2021 | Cramer | G06T 7/143 |
| 2021/0248761 | A1* | 8/2021 | Liu | G06N 3/0481 |
| 2021/0357655 | A1* | 11/2021 | Park | G06V 10/809 |
| 2022/0012875 | A1* | 1/2022 | Arnaout | G06V 10/764 |

OTHER PUBLICATIONS

Benenson et al., "Large-scale interactive object segmentation with human annotators", arXiv:1903.10830v2 [cs.CV] Apr. 17, 2019, 10 pages.
He et al., "Mask R-CNN", arXiv:1703.06870v3 [cs.CV] Jan. 24, 2018, 12 pages.
Yu et al., "Deep Layer Aggregation", UC Berkeley, 10 pages.

* cited by examiner

PRELABELING FOR SEMANTIC SEGMENTATION TASKS

BACKGROUND

Field of the Various Embodiments

Embodiments of the present disclosure relate generally to labeling of data for machine learning, and more particularly, to prelabeling for semantic segmentation tasks.

Description of the Related Art

Advances in the field of machine learning and increases in available computing power have led to a proliferation in the applications of machine learning. Many machine learning models, including deep neural networks, require large amounts of labeled data to train and verify. Such labeled data typically includes samples that have been tagged with labels. For example, labeled images in which the classifications and locations of objects (e.g., people, cars, etc.) have been tagged may be used to train a machine learning model to perform object classification and localization.

Labeled data can be obtained by relying on human judgment to tag data with appropriate labels. However, such manual labeling of data is time consuming and labor intensive, and few traditional tools exist to facilitate the process of labeling data.

In addition, manually generated labels vary in accuracy and quality, which in turn affects the performance of machine learning models trained and/or validated using the labels. For example, images, text, and/or other data may be provided to a large number of people, along with instructions for generating specific types of labels from the data. As a result, labels produced by multiple people for the same task can differ, depending on the complexity of the instructions, how each person interprets the instructions, the amount of labeling experience the person has, and/or other factors.

As the foregoing illustrates, what is needed in the art are techniques for evaluating and improving labeling quality.

SUMMARY

One embodiment of the present invention sets forth a technique for performing a labeling task. The technique includes generating a multi-scale representation of an image as input to a machine learning model. The technique also includes performing one or more operations that apply the machine learning model to the multi-scale representation of the image to produce a semantic segmentation comprising predictions of labels for regions of pixels in the image. The technique further includes outputting, in a user interface, the semantic segmentation for use in assisting a user in specifying the labels for the pixels in the image.

By initializing pixels in the image with predictions of labels outputted by the machine learning model, the disclosed embodiments allow users to perform semantic segmentation of the image by confirming the labels or making corrections to the labels. As a result, the users are able to label pixels in the image more quickly than conventional techniques that require users to specify labels for all pixels in an image. Because the amount of user input or time required to label pixels in the image is reduced, processing time and/or resource consumption by servers, client devices, and/or applications that provide user interfaces or tools for performing user labeling of the image is also reduced. Consequently, the disclosed techniques provide technological improvements in the generation of labeled data for machine learning and/or the training, validation, and execution of machine learning models.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments. The patent or application file contains at least one drawing executed in color. Copies of this patent or patent application publication with color drawing(s) will be provided by the Office upon request and with payment of the necessary fee.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
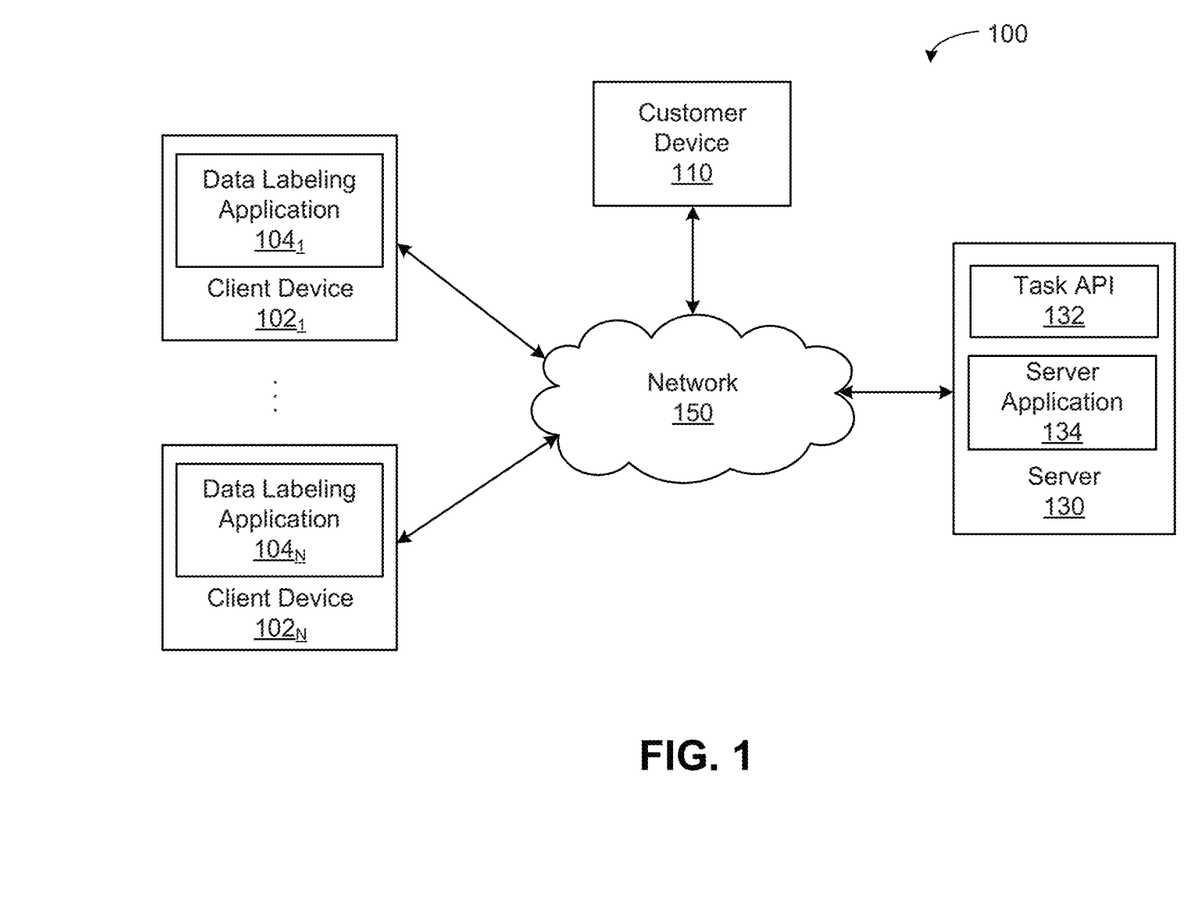
FIG. 1 is a conceptual illustration of a system configured to implement one or more embodiments.

FIG. 1 illustrates a system 100 configured to implement one or more aspects of the present disclosure. As shown, system 100 includes, without limitation, a server computing device 130 (also referred to herein as "server 130") and a number of client devices $102_{1-N}$, each of which is referred to individually herein as a client device 102. Server 130 and client devices $102_{1-N}$ interoperate to facilitate data labeling by users of client devices $102_{1-N}$ in response to a customer request. Server 130, client devices $102_{1-N}$, and a customer device 110 communicate via a network 150, which may be a wide area network (WAN) such as the Internet, a local area network (LAN), or any other suitable network. Although a single server 130 and customer device 110 are shown for illustrative purposes, system 100 may generally include any number of servers, customer devices, and client devices, each of which may be a physical computing system or a virtual computing system running in, e.g., a data center or cloud.

Illustratively, server 130 exposes a task application programming interface (API) 132 that allows customers to send data and data labeling requests, via API calls. Any suitable data and labeling requests may be transmitted via such API calls to server 130. For example, in the context of autonomous vehicles, photographic, LIDAR (light detection and ranging), and/or radar (radio detection and ranging) data captured by vehicle-mounted sensors may be uploaded from customer device 110 to the server 130, along with a request that particular types of objects (e.g., vehicles, bicycles, pedestrians, etc.) be tagged in such data. GPS (global positioning system) data may also be uploaded and may be included in LIDAR data.

In some embodiments, a server application 134 executing on server 130 requires the data and data labeling requests submitted via API calls to satisfy predefined restrictions. For example, restrictions may exist on which classes (e.g., vehicles, pedestrians, buildings, etc.) of objects can be labeled, the format and size of the data, etc.

Server application 134 processes data received via task API 132 and sends the processed data to data labeling applications $104_{1-N}$ running in client devices $102_{1-N}$, along with indications of data labeling tasks to be performed by users of client devices $102_{1-N}$, based on the customer's request. Any suitable processing of received data may be performed by server application 134. For example, in some embodiments, server application 134 could convert photographic, LIDAR, or radar data received in different formats to a single format that data labeling applications $104_{1-N}$ can read and process. In another example, server application 134 could compress the received data to a smaller size. Although server application 134 is shown as a single application for illustrative purposes, it should be understood that the functionality of server application 134 may be performed by multiple applications or other types of software in alternative embodiments.

Each of data labeling applications $104_{1-N}$, referred to individually herein as a data labeling application 104, digests and renders data received from server application 134 for display via a user interface (UI). In some embodiments, data labeling application 104 may render one or more colored point clouds for visualizing three-dimensional (3D) data (e.g., LIDAR and/or radar data), while permitting users to navigate and view the point clouds from different perspectives. For example, in some embodiments, data labeling application 104 may use down sampling to obtain an aggregated point cloud that includes only points conveying the most information. In another example, data labeling application 104 could, based on a user specification, blend point cloud colorings derived from different data sources (e.g., photographic, label, and/or LIDAR intensity data). In addition to displaying rendered point clouds via a UI, data labeling application 104 may also display photographs associated with those point clouds at the same time.

In some embodiments, data labeling application 104 provides tools to facilitate data labeling tasks. For example, the tools could allow a user to draw annotations in the form of cuboids, label points as belonging to particular objects, etc. using a mouse and/or keyboard. As additional examples, tools could be provided that automatically adjust the position and/or orientation of a user-designated cuboid, propagate a user-designated cuboid from a key frame to other frames, etc., thereby aiding the user in performing data labeling tasks.

Figure 2:
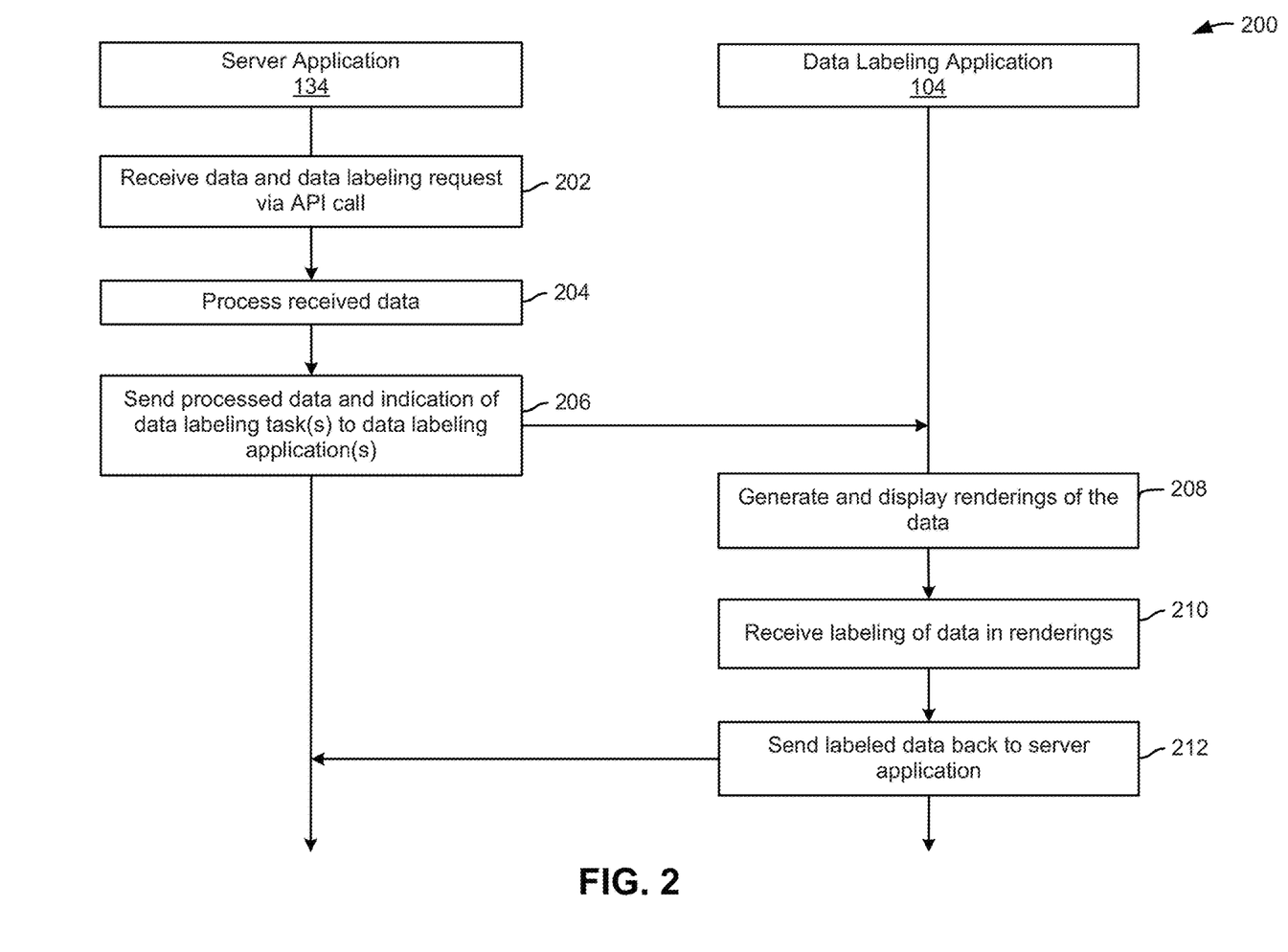
FIG. 2 is a flow diagram of method steps for processing data labeling requests, according to various embodiments.

FIG. 2 is a flow diagram of method steps for processing data labeling requests, according to various embodiments. Although the method steps are described with reference to the system of FIG. 1, persons skilled in the art will understand that any system may be configured to implement the method steps, in any order, in other embodiments.

As shown, a method 200 begins at step 202, where server application 134 receives data and a corresponding data labeling request via an API call. The data may be in any suitable format acceptable to server application 134. For example, server application 134 may need data to be sent in one or more JavaScript Object Notation (JSON) files. Similarly, the data labeling request may need to satisfy certain restrictions, such as which classes (e.g., vehicles, pedestrians, buildings, etc.) of objects can be labeled.

At step 204, server application 134 processes the received data. Any suitable processing may be performed by server application 134. In some embodiments, the processing may include compressing the received data and/or converting the received data into a format that can be read by data labeling application(s). For example, the received data could be converted to a data format in which points of a 3D point cloud are represented in a list as (x, y, z) coordinates with associated time stamps.

At step 206, server application 134 sends the processed data and an indication of data labeling task(s), based on the received request, to one or more data labeling applications. Although one data labeling application 104 is shown for illustrative purposes, it should be understood that server application 134 may send the processed data and indication of data labeling task(s), via a network, to any number of data labeling applications running on different client devices.

At step 208, a data labeling application 104 generates and displays renderings of the received data. For example, data labeling application 104 may display rendered point cloud(s) via a UI that permits a user to navigate and view the point cloud(s) from different perspectives. The UI may also, or instead, display text and/or images, and data labeling application 104 may provide tools to facilitate labeling of the rendered point cloud(s), text, images, and/or other data via the UI.

At step 210, data labeling application 104 receives labeling of data in the renderings. For example, the user could look around a two-dimensional (2D) or 3D scene, identify objects of interest, use a mouse to indicate where those objects are located, use the mouse and a keyboard to precisely size cuboids or bounding boxes around the objects, etc. In such a case, the user may further navigate forward and/or backwards in time to see where the objects move over time, and label the objects in every frame that is associated with a distinct point in time. As described, data labeling application 104 may provide tools that enable such labeling, as well as tools that facilitate user labeling by, e.g., automatically adjusting the position and/or orientation of a user-designated cuboid, propagating a cuboid from one frame designated as a key frame to other frames, etc.

At step 212, data labeling application 104 sends the labeled data back to server application 134. The labeled data may be sent to server application 134 via a network, such as the Internet, and server application 134 may then return the labeled data to the customer. In some embodiments, optional verification and/or other processing may be performed prior to returning labeled data to the customer.

Figure 3:
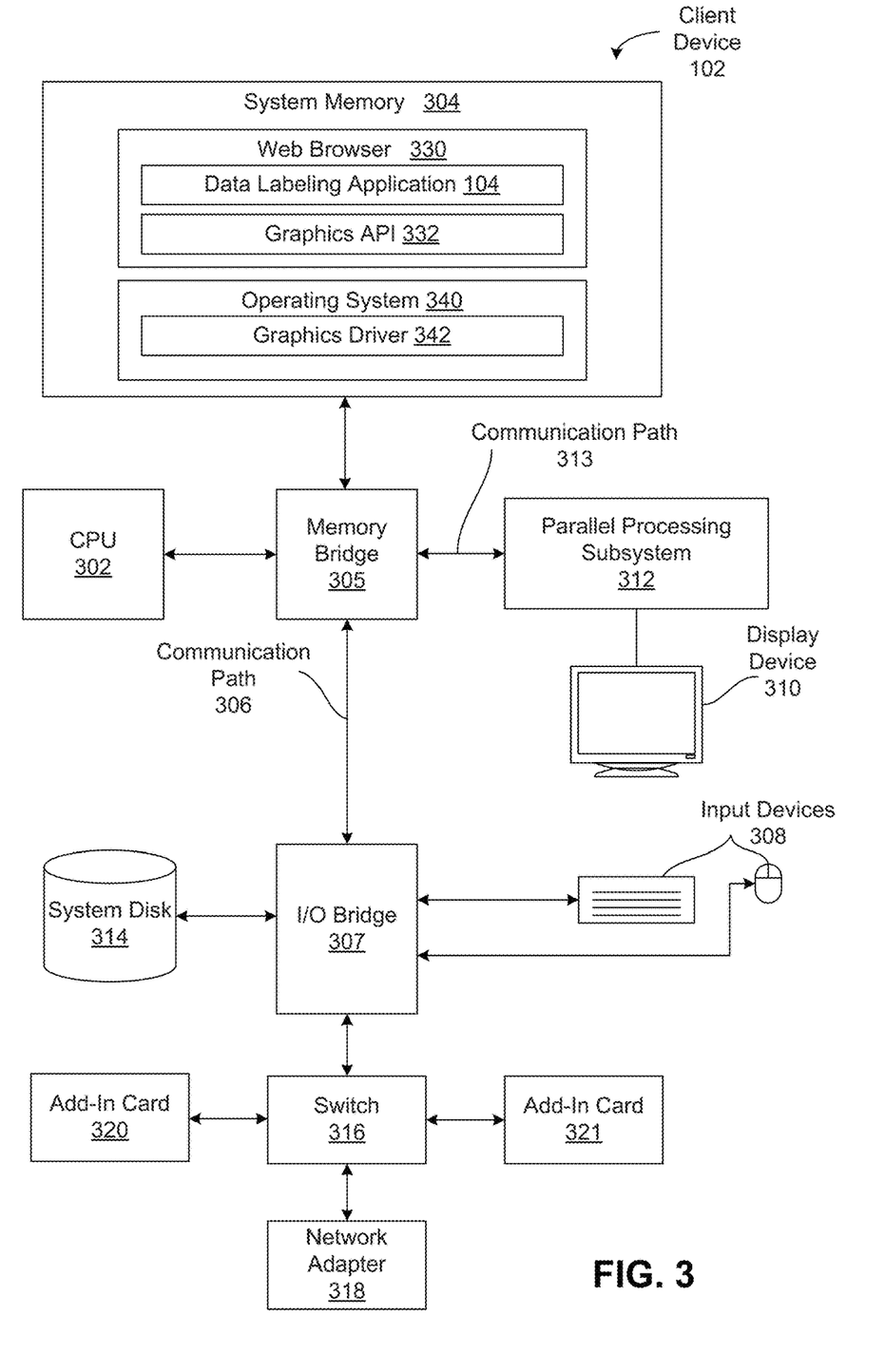
FIG. 3 is a more detailed illustration of the client device of FIG. 1, according to various embodiments.

FIG. 3 is a more detailed illustration of the client device of FIG. 1, according to various embodiments. Although client device 102 is shown for illustrative purposes, it should be understood that server 130 and customer device 110 may include similar physical components as client device 102, but run different software such as server application 134.

As shown, client device 102 includes, without limitation, a central processing unit (CPU) 302 and a system memory 304 coupled to a parallel processing subsystem 312 via a memory bridge 305 and a communication path 313.

Memory bridge 304 is further coupled to an I/O (input/output) bridge 307 via a communication path 306, and I/O bridge 307 is, in turn, coupled to a switch 316.

In operation, I/O bridge 307 is configured to receive user input information from input devices 308, such as a keyboard or a mouse, and forward the input information to CPU 302 for processing via communication path 106 and memory bridge 305. Switch 316 is configured to provide connections between I/O bridge 307 and other components of computer system 300, such as a network adapter 318 and various add-in cards 320 and 321.

I/O bridge 307 is coupled to a system disk 314 that may be configured to store content and applications and data for use by CPU 302 and parallel processing subsystem 312. As a general matter, system disk 314 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to the I/O bridge 307 as well.

In various embodiments, memory bridge 305 may be a Northbridge chip, and I/O bridge 307 may be a Southbridge chip. In addition, communication paths 306 and 313, as well as other communication paths within client device 102, may be implemented using any technically suitable protocols, including, without limitation, AGP (Accelerated Graphics Port), HyperTransport, or any other bus or point-to-point communication protocol known in the art.

In some embodiments, parallel processing subsystem 312 includes a graphics subsystem that delivers pixels to a display device 310 that may be any conventional cathode ray tube, liquid crystal display, light-emitting diode display, or the like. In such embodiments, parallel processing subsystem 312 incorporates circuitry optimized for graphics and video processing, including, for example, video output circuitry. Such circuitry may be incorporated across one or more parallel processing units (PPUs) included within parallel processing subsystem 312. In other embodiments, parallel processing subsystem 312 incorporates circuitry optimized for general purpose and/or compute processing. Again, such circuitry may be incorporated across one or more PPUs included within parallel processing subsystem 312 that are configured to perform such general purpose and/or compute operations. In yet other embodiments, the one or more PPUs included within parallel processing subsystem 312 may be configured to perform graphics processing, general purpose processing, and compute processing operations. System memory 104 includes at least one device driver 103 configured to manage the processing operations of the one or more PPUs within parallel processing subsystem 312.

In various embodiments, parallel processing subsystem 312 may be integrated with one or more of the other elements of FIG. 3 to form a single system. For example, parallel processing subsystem 312 may be integrated with the CPU 302 and other connection circuitry on a single chip to form a system on chip (SoC).

It will be appreciated that the system shown herein is illustrative and that variations and modifications are possible. The connection topology, including the number and arrangement of bridges, the number of CPUs, and the number of parallel processing subsystems, may be modified as desired. For example, in some embodiments, system memory 304 could be connected to CPU 302 directly rather than through memory bridge 305, and other devices would communicate with system memory 304 via memory bridge 305 and CPU 302. In other alternative topologies, parallel processing subsystem 312 may be connected to I/O bridge 307 or directly to CPU 302, rather than to memory bridge 305. In still other embodiments, I/O bridge 307 and memory bridge 305 may be integrated into a single chip instead of existing as one or more discrete devices. Lastly, in certain embodiments, one or more components shown in FIG. 3 may not be present. For example, switch 316 could be eliminated, and network adapter 318 and add-in cards 320, 321 would connect directly to I/O bridge 307.

Illustratively, data labeling application 104 that runs in client device 102 is a web application running in a web browser 330. Although shown as a web application for illustrative purposes, data labeling application 104 may be implemented as a native application, mobile application, or other type of software in alternative embodiments. Further, functionality of data labeling application 104 may be distributed across multiple pieces of software in some embodiments. As shown, system memory 316 stores web browser 330 and an operating system 340 on which web browser 330 runs. Operating system 340 may be, e.g., Linux® or Microsoft Windows® and includes a graphics driver 342 that implements a graphics API 332 exposed by the web browser 330 for rendering content, via parallel processing subsystem 312 (and/or CPU 302). For example, graphics API 332 could be WebGL (Web Graphics Library), which is a JavaScript API for rendering interactive 3D and 2D graphics within a compatible web browser. In some embodiments, data labeling application 104 invokes graphics API 332 to render 3D point clouds, 2D images, and/or other types of data, and data labeling application 104 provides tools that facilitate the labeling of data, according to techniques disclosed herein.

In alternate embodiments, system 100 may include any number of client devices 102, any number of servers 130, any number of customer devices 110, any number of memories 304, and any number of processors 302 that are implemented in any technically feasible fashion. Further, client devices 102, servers 130, memory 304, and processor 302 may be implemented via any number of physical resources located in any number of physical locations. For example, memory 304 and processor 302 could be implemented in a cloud computing environment or a distributed computing environment that is accessible to client device 102. The connection topology between the various units in FIGS. 1 and 2 may be modified as desired.

Prelabeling for Semantic Segmentation Tasks

Figure 4:
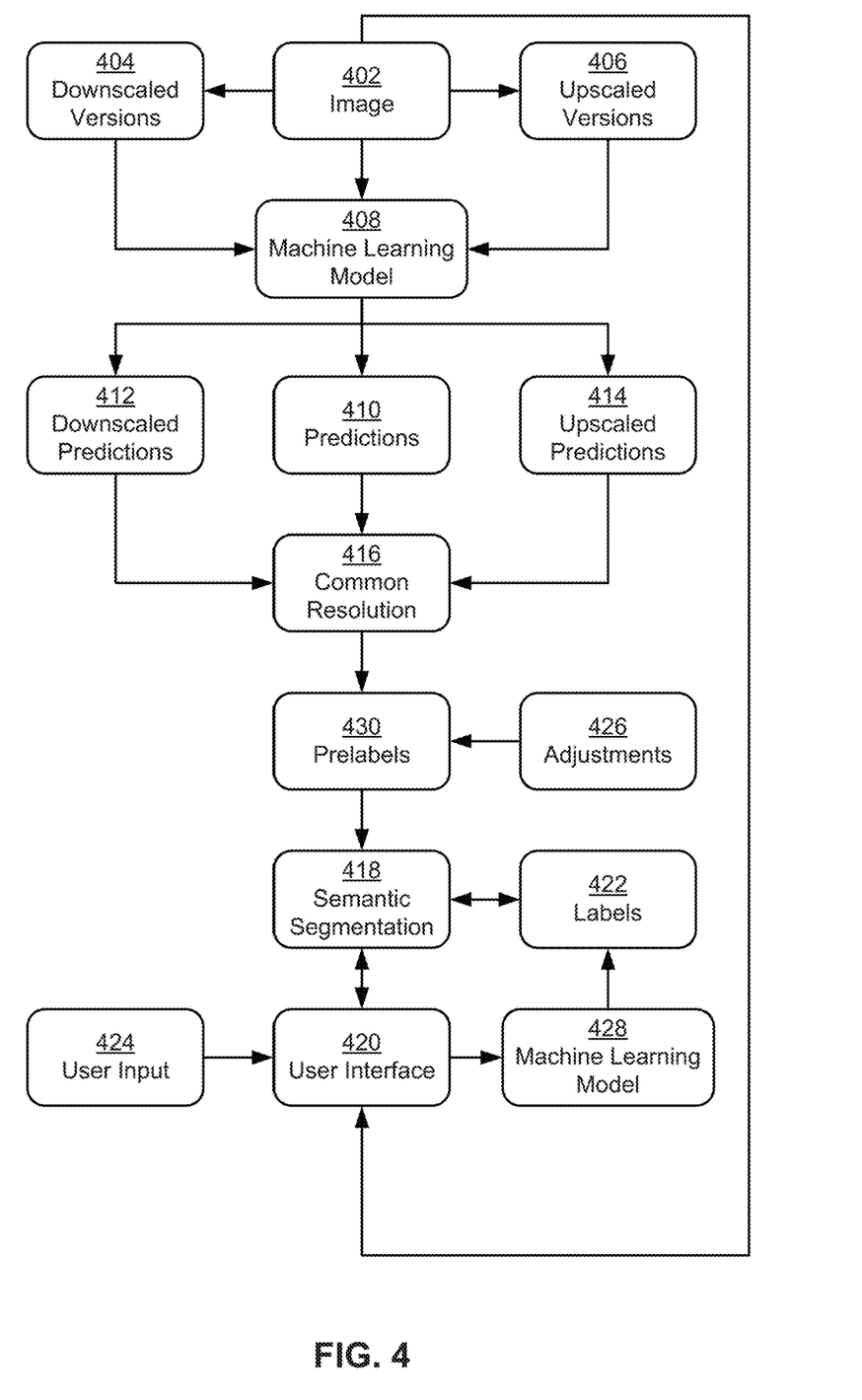
FIG. 4 illustrates the prelabeling of an image for a semantic segmentation task, according to various embodiments.

FIG. 4 illustrates the prelabeling of an image 402 for a semantic segmentation 418 task, according to various embodiments. Steps carried out to prelabel image 402 may be performed by server application 134 and/or other components of server 130. These steps may also, or instead, be performed by customer device 110, one or more client devices $102_{1-N}$, and/or other components of system 100.

Image 402 includes a two-dimensional representation of a scene from which semantic segmentation 418 is created. For example, image 402 includes pedestrians, roads, skies, buildings, trees, cars, and/or other objects or entities that are captured by one or more cameras and/or other types of sensors. In turn, semantic segmentation 418 includes labels 422 of the pixel-level locations of the objects or entities in image 204. For example, semantic segmentation 418 includes the same dimensions as image 402. A given element in semantic segmentation 418 stores a value of a label for the corresponding pixel in image 402.

In some embodiments, prelabels 430 related to semantic segmentation 418 include estimates of labels 422 in semantic segmentation 418. These predicted labels 422 can be used to assist or expedite the generation of a more accurate semantic segmentation 418 by one or more users via a user interface 420. For example, a machine learning model 408 produces prelabels 430 as estimates of labels 422 for individual pixels in image 402. Prelabels 430 are then used as an initial representation of semantic segmentation 418, which is outputted as an overlay, highlighting, shading, pixel boundaries between objects in image 402, and/or another visual representation of the estimated labels 422 in image 402 within a graphical user interface 420 provided by data labeling application 104. A user can then provide user input 424 for adjusting the outputted semantic segmentation 418 and/or otherwise specifying labels 422 via user interface 420. In other words, prelabels 430 represent initial estimates of labels 402 for pixels in image 402 that are outputted with image 402 to reduce the amount of user input 424 required to specify labels 422.

As shown, input to machine learning model 408 includes a multi-scale representation of image 402 (i.e., multiple versions of image 402 at different scales). The multi-scale representation includes the original image 402, a number of downscaled versions 404 of image 402, and a number of upscaled versions 406 of image 402. For example, scale factors of 0.5 and 0.25 are applied to image 402 to produce downscaled versions 404 that are half the size of image 402 and a quarter of the size of image 402, respectively. A bilinear interpolation technique and/or another interpolation technique and scale factors of 1.25, 1.5, 1.75, and 2 are also applied to image 402 to produce upscaled versions 406 of image 402 that are 1.25, 1.5, 1.75, and 2 times larger than image 402, respectively. One or more upscaled versions 406 are optionally divided into quadrants and/or other subsets of the upscaled version(s), and each subset is inputted individually into machine learning model 408 in lieu of the corresponding upscaled version to accommodate memory and/or other resource limits associated with executing machine learning model 408.

In one or more embodiments, machine learning model 408 includes a deep layer aggregation (DLA) architecture that aggregates output from convolutional and/or other layers in a deep neural network (DNN) into a number of intermediate layers and further aggregates output of the intermediate layers with one another and/or the output of other layers in the DNN. In these embodiments, aggregation refers to the combination of different layers throughout the DNN, and DLA refers to a group of aggregations that is compositional, nonlinear, and involves passing the earliest aggregated layer through multiple aggregations.

In some embodiments, components of machine learning model 408 include convolutional and/or other neural network layers that are grouped into blocks; these blocks are then grouped into stages by the corresponding feature resolution. The components additionally include aggregation nodes that combine the output of different layers, blocks, and/or stages in a way that fuses semantic and spatial information for visual recognition and localization. These aggregation nodes can be based on any block or layer in a DNN. For example, a simple and/or efficient aggregation node includes a single convolution followed by batch normalization and a nonlinearity.

In turn, the DLA architecture includes an iterative deep aggregation (IDA) structure that iteratively stacks the backbone architecture of machine learning model 408. For example, stacked blocks in machine learning model 408 are divided into stages according to feature resolution, where deeper stages contain more semantic information but are more spatially coarse. In turn, aggregation nodes in the IDA structure are sequentially structured, so that the first aggregation node merges the first two stages with the shallowest, smallest scale, and each subsequent aggregation node merges the previous aggregation node with a deeper stage at a larger scale. As a result, shallow features are refined as they are propagated through different stages of aggregation.

The IDA structure is produced for a series of layers $x_1, \ldots, x_n$ using the following deep aggregation function I:

$$I(x_1, \ldots, x_n) = \begin{cases} x_1, & n = 1 \\ I(N(x_1, x_2), \ldots, x_n), & n > 1 \end{cases}$$

where N represents the aggregation node.

The DLA architecture also, or instead, includes a hierarchical deep aggregation (HDA) structure that aggregates hierarchically through a tree structure of aggregation nodes to span the feature hierarchy of the network across different depths. For example, pairs of consecutive blocks or stages in machine learning model 408 are merged using a first layer of aggregation nodes, and pairs of consecutive aggregation nodes in the first layer are merged using a second layer of aggregation nodes. Merging of pairs of aggregation nodes from one layer by additional aggregation nodes in a next layer is repeated until a final layer containing a single aggregation node is used as the output of machine learning model 408.

The HDA structure is produced using the following function $T_n$ with depth n:

$$T_n(x) = N(R_{n-1}^n(x), R_{n-2}^n(x), \ldots, R_1^n(x), L_1^n(x), L_2^n(x))$$

where N represents the aggregation node. R and L are defined as:

$$L_2^n(x) = B(L_1^x(x)), L_1^n(x) = B(R_1^x(x))$$

$$R_m^n(x) = \begin{cases} T_m(x), & m = n-1 \\ T_m(R_{m+1}^n(x)) & \text{otherwise} \end{cases}$$

where B represents a convolutional block.

A variation on the HDA structure includes feeding the output of an aggregation node back into the backbone as the input to the next sub-tree. This preserves features by propagating the aggregation of all previous blocks instead of just the preceding block to a given layer in the backbone. In another variation on the HAD structure, aggregation nodes associated with the same neural network depth (i.e., aggregation nodes that are directly or indirectly connected to the same layer of the DNN) are optionally merged (by combining the parent and left child) for efficiency.

In some embodiments, machine learning model 408 is trained in a way that emphasizes correct labeling of edges or boundaries between objects in images. For example, parameters of machine learning model 408 are updated based on a loss function that includes a first weight for a first pixel in an interior of an object and a second weight that is a multiple of the first weight (e.g., 50 to 100 times greater than the first weight) for a second pixel in a boundary of the object. As a result, machine learning model 408 is trained to correctly identify boundaries of objects in the images, which facilitates subsequent user labeling of pixels in image 402 without requiring extensive changes to the boundaries by users.

After image 402, downscaled versions 404, and upscaled versions 406 are inputted into machine learning model 408, machine learning model 408 generates predictions 410 of labels 422 from the original image 402, downscaled predictions 412 of labels 422 from downscaled versions 404 of image 402, and upscaled predictions 414 of labels 422 from upscaled versions 406 of image 402. Continuing with the above example, predictions 410 include probabilities of labels 422 for pixels in image 402, downscaled predictions 412 include probabilities of labels 422 for pixels in downscaled versions 404 that are half the size of image 402 and a quarter of the size of image 402, and upscaled predictions 414 include probabilities of labels 422 for pixels in upscaled versions 406 of image 402 that are 1.25, 1.5, 1.75, and 2 times larger than image 402.

Downscaled predictions 412, predictions 410, and upscaled predictions 412 are converted into a common resolution 416. For example, downscaled predictions 412 are scaled up (e.g., using an interpolation technique) to have the same dimensions as predictions 410, and upscaled predictions 412 are scaled down to have the same dimensions as predictions 410. In another example, downscaled predictions 412, predictions 410, and upscaled predictions 412 are all scaled up or down to have the same dimensions.

Prelabels 430 for pixels in image 402 are then generated by aggregating the converted downscaled predictions 412, predictions 410, and upscaled predictions 414 at common resolution 416. For example, prelabels 430 are obtained as the highest probability classes for individual pixels in image 402 at common resolution 416. The highest probability classes are selected from the per-pixel average of the converted downscaled predictions 412, predictions 410, and upscaled predictions 414 at common resolution 416. Alternatively, the highest probability classes are selected from a weighted per-pixel average of downscaled predictions 412, predictions 410, and upscaled predictions 414 at common resolution 416. The weighted average includes a different weight for each scaling of image 402; the weight can be selected based on the accuracy of machine learning model 408 in predicting labels 422 at that scaling and/or other factors.

Consequently, prelabels 430 include predicted probabilities of labels 422 for individual pixels in image 402 at common resolution 416. These predicted probabilities are generated by inputting a multi-scale representation of image 408 into machine learning model 408 and rescaling and aggregating output produced by machine learning model 408 from the multi-scale representation.

One or more adjustments 426 are made to prelabels 430 to improve the quality and/or usefulness of prelabels 430 in expediting the subsequent generation of labels 422 by users. In some embodiments, adjustments 426 include removing a predicted label from a region of pixels when the size of the region falls below a threshold. For example, a small region in image 402 that includes a highest predicted probability of "car" is unlabeled when the region is smaller than a threshold and/or when the region is fully surrounded by a different label. In turn, user input 424 is required to assign a label to the region before user-generated labels 422 for pixels in image 402 are accepted.

Adjustments 426 also, or instead, include replacing a first predicted label for a first region of pixels with a second predicted label for a second region of pixels surrounding the first region when the first and second predicted labels match certain values. Such replacement is based on the values of the labels, the probabilities of the predicted labels, the size of one or both regions, and/or other factors.

For example, a label of "dress" in an image related to fashion is associated with high confidence that the label occupies a simply connected (i.e., without holes) region within the image. Thus, when a first region with a predicted label other than "dress" is surrounded by a second region with a predicted label of "dress," the predicted label of the first region is replaced with a predicted label of "dress." One or more thresholds are optionally applied to attributes of the first and/or second regions prior to replacing the predicted label of the first region with "dress." These thresholds include, but are not limited to, a maximum size for the first region (e.g., as a proportion of the overall image size and/or the size of the second region) and/or an upper limit on the probability of the predicted label for the first region. Thus, the thresholds may be used to ensure that the label for the first region is replaced only when the first region is sufficiently small and/or the predicted probability of the original label for the first region is sufficiently low.

After adjustments 426 are applied to prelabels 430, prelabels 430 are outputted as an initial representation of semantic segmentation 418 in user interface 420. In turn, the user(s) provide user input 424 via user interface 420 to interact with semantic segmentation 418, update semantic segmentation 418, confirm labels 422 in semantic segmentation 418, and/or otherwise carry out a labeling task involving semantic segmentation 418.

For example, user interface 420 includes a graphical user interface (GUI), web-based user interface, touch user interface, voice user interface, and/or another type of interface for outputting image 402 and semantic segmentation 418 to the user(s) and receiving user input 424 for modifying semantic segmentation 418 and/or specifying labels 422 related to image 402. User interface 420 may display image 402 to the user and include tools for zooming in and out of various parts of image 420. User interface 420 may also display a representation of semantic segmentation 418 as one or more adjustable boundaries, colored regions, highlighted regions, shaded regions, and/or other visual indications of predicted labels 422 for pixels in image 420. User interface 420 may additionally include tools for adjusting the boundaries of the predicted labels 422, defining a new region of pixels to be associated with a given label, confirming labels 422 for regions of pixels in image 420, changing labels 422 for regions of pixels in image 420, and/or otherwise specifying user input 424 related to labels 422 for regions of pixels in image 420.

In one or more embodiments, semantic segmentation 418 and/or labels 422 are updated by another machine learning model 428 based on user input 424 that indicates locations of one or more labels 422 in image 402. As shown, user input 242 that corrects and/or adjusts semantic segmentation 418 is received via user interface 420 and provided to machine learning model 428, and machine learning model 428 updates labels 422 in semantic segmentation 418 based on user input 424. The updated semantic segmentation 418 is then displayed in user interface 420 for subsequent review and/or modification by the user.

For example, machine learning model 428 includes an "interactive" segmentation model that includes (but is not limited to) a convolutional neural network, residual neural network, and/or another type of deep neural network. Input into machine learning model 428 includes RGB values of pixels in image 420, one or more bounding boxes for objects in image 420, a current version of semantic segmentation 418, and/or user input 424 for correcting semantic segmentation 418. User input 424 may include a series of clicks that add pixels and/or regions of pixels to a given label and/or remove pixels and/or regions of pixels from a given label. User input 424, as supplied to machine learning model 428, can be encoded as a distance transform from the clicks, a Gaussian centered on each click, a binary disk (e.g., a circular disk with a predefined radius around a click point), and/or another representation. In response to the inputted data, machine learning model 428 generates an updated set of labels 422 in semantic segmentation 418 that account for the corrective clicks in user input 424. The updated semantic segmentation 418 is displayed in user interface 420, and additional user input 424 is received via user interface 420 and used by machine learning model 428 to update labels 422 and semantic segmentation 418 until labeling of image 402 by a given user is complete.

Figure 5:
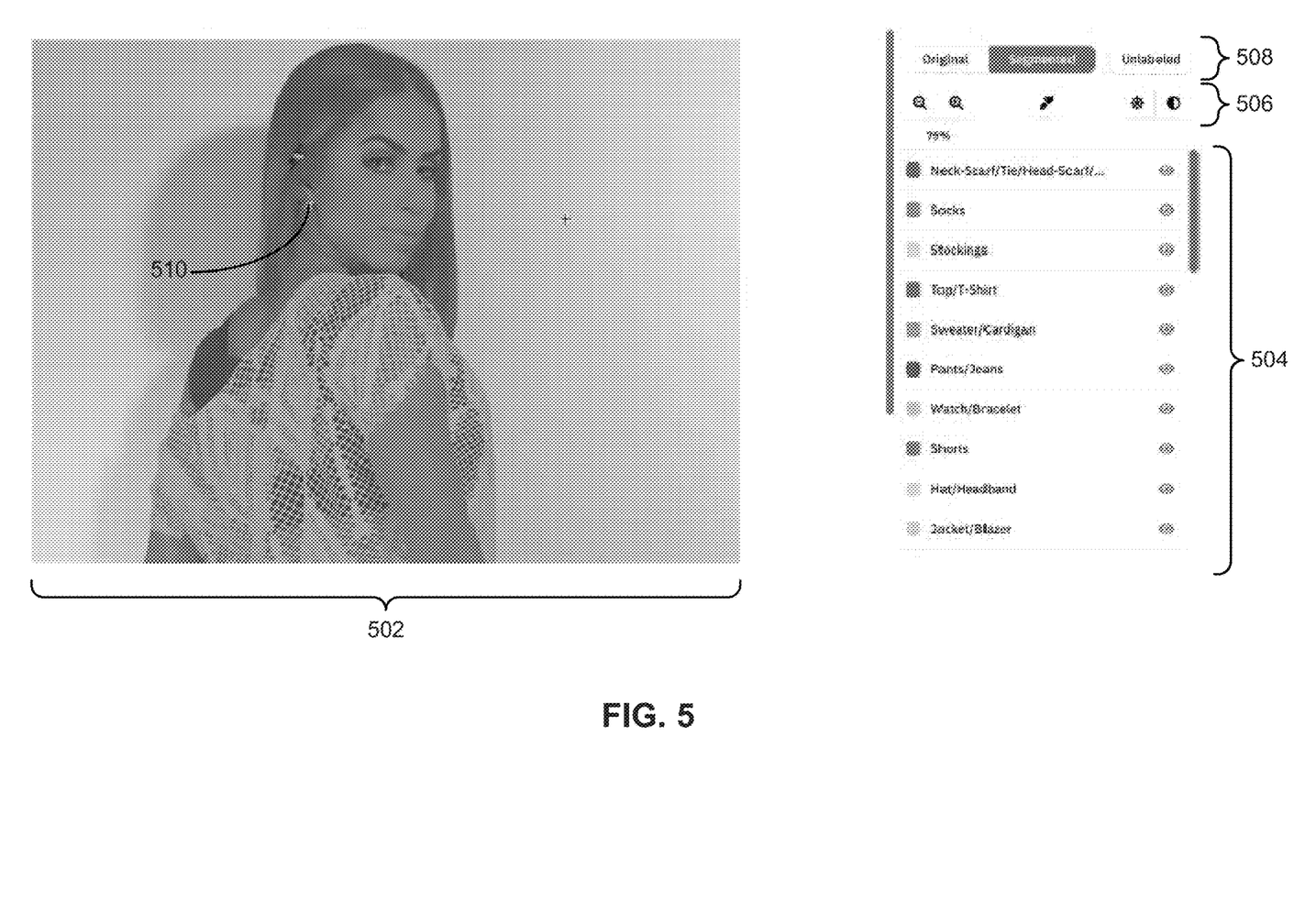
FIG. 5 illustrates an example screenshot of the user interface (UI) of FIG. 4, according to various embodiments.

FIG. 5 illustrates an example screenshot of user interface 420 of FIG. 4, according to various embodiments. As mentioned above, user interface 420 is configured to assist a user with a semantic segmentation task. As shown, the example user interface 420 includes a portion 502 that displays a representation of an image to the user, as well as a number of user-interface elements 504-508 that allow the user to generate a semantic segmentation of the image.

In particular, user-interface elements 504 allow the user to identify and/or view labeled regions in the image as color-coded overlays in portion 502. For example, user-interface elements 504 include a list of classes related to clothing or fashion. Each element in the list includes a name of a corresponding class, a color of the class in portion 502, and an "eyeball" icon that can be toggled to show or hide regions labeled with the class in portion 502.

User-interface elements 506 include tools for adjusting the display of the image in portion 502 and/or specifying labels for pixels or regions of pixels in the image. For example, user-interface elements 506 include a zoom tool that allows the user to zoom in and/or out of the image. User-interface elements 506 also, or instead, include a drawing tool that allows the user to select pixels or regions of pixels in the image. The drawing tool additionally allows the user to assign, change, or remove a label for the selected pixels or regions. User-interface elements 506 also, or instead, include adjustment tools that allow the user to specify the brightness, contrast, exposure, and/or other controls related to the display of the image in portion 502. In turn, the user may interact with the adjustment tools to discern boundaries between objects or entities in the image and/or assign more accurate labels to pixels in the image.

User-interface elements 508 include tools for toggling the display of labeled and/or unlabeled regions of the image. For example, user-interface elements 508 include a button named "Original" that can be clicked to view the original image without labeling overlays, a button named "Segmented" that can be clicked to view the image with labeling overlays, and a button named "Unlabeled" that can be clicked to view highlighting, overlays, and/or other visual indications of unlabeled portions in the image.

In some embodiments, portion 502 is initialized with a "prelabeled" semantic segmentation of the image to assist the user with generating a more accurate semantic segmentation of the image. As discussed above, prelabeling of the semantic segmentation may be performed by inputting the image at multiple scales into a machine learning model (e.g., machine learning model 408 of FIG. 4), obtaining multiple versions of predicted labels for pixels at the multiple scales as output from the machine learning model, scaling the predictions into a common resolution, and aggregating the scaled predictions into the prelabeled semantic segmentation. Such prelabeling can be performed in an offline or batch-processing basis prior to assigning a task for generating a semantic segmentation of the image to users.

When a user starts a semantic segmentation task for the image, pixels in the image are assigned "tentative" label values representing the highest probability labels from the prelabeled semantic segmentation. In turn, user interface 420 displays the highest probability labels as color-coded overlays in portion 502. For example, portion 502 includes colored overlays representing tentative labels of hair, skin, and different types of clothing in the image, as well as a gray overlay representing a tentative label of a background of the image.

Portion 502 additionally includes a region 510 of pixels that lacks a label. For example, region 510 includes pixels that show an earring worn by a person in the image. Region 510 may be unlabeled during adjustments that remove labels from pixel regions that fall below a certain size from the prelabeled semantic segmentation. Region 510 may also, or instead, be unlabeled when the highest probability associated with a given label in region 510 falls below a threshold. In turn, the user is required to manually specify one or more labels for pixels in region 510 before the user is able to submit the labeling task as complete.

During the semantic segmentation task, the user can interact with user-interface elements 504-508 to control the display of the image and/or overlays, as well as adjust, confirm, and/or change the labels for pixels or regions of pixels in the image. As the user provides input for correcting or confirming labels for pixels or regions of pixels in the image, another machine learning model (e.g., machine learning model 428 of FIG. 4) is optionally used to update the semantic segmentation, and the updated semantic segmentation is displayed within portion 502. The semantic segmentation is thus iteratively updated by the user and/or machine learning model until all pixels in the image have been labeled and the user determines that the labels are correct.

Figure 6:
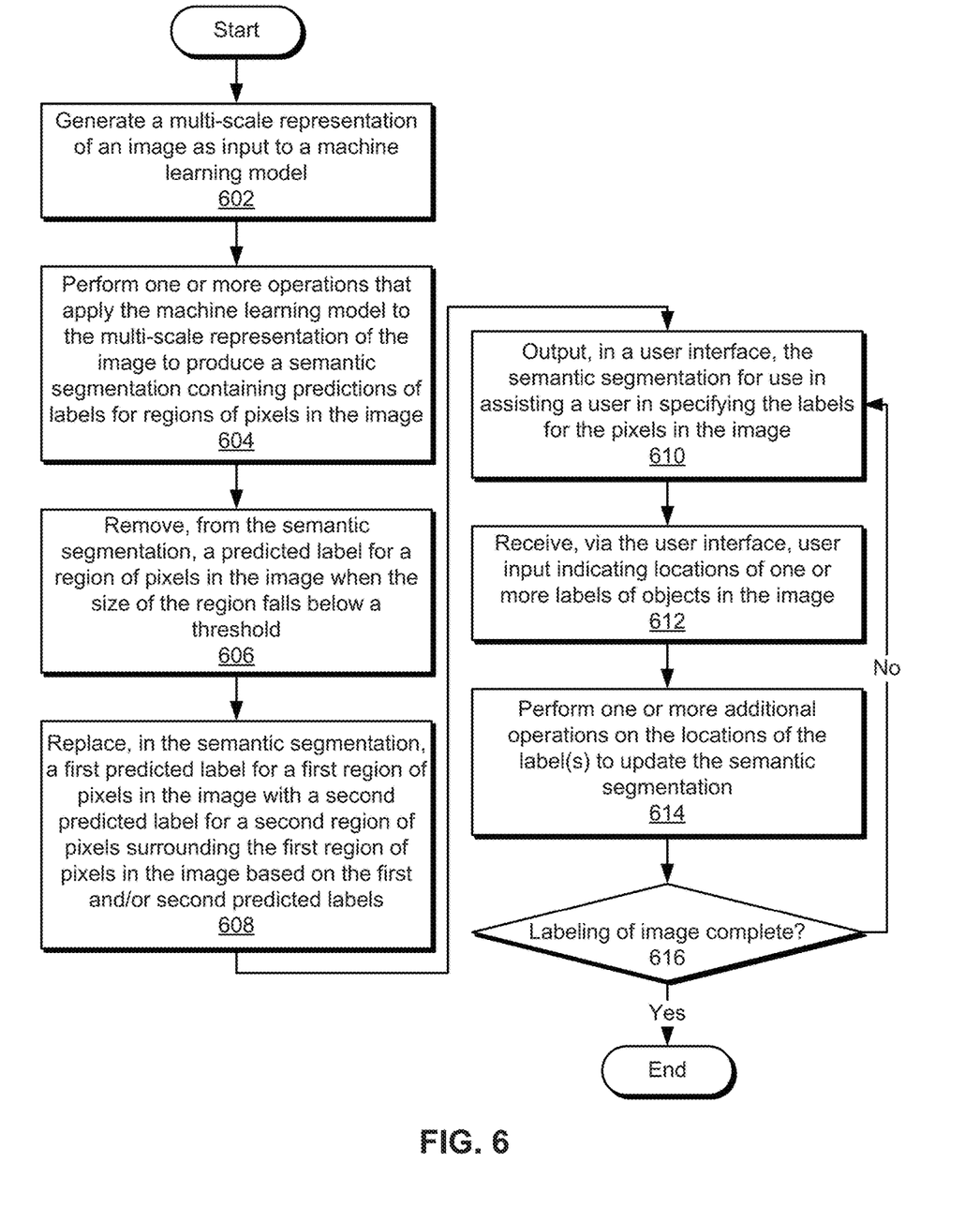
FIG. 6 is a flow chart of method steps for performing a labeling task, according to various embodiments.

FIG. 6 is a flow chart of method steps for assisting a labeling task, according to various embodiments. Although the method steps are described with reference to the system of FIGS. 1 and 3, persons skilled in the art will understand that any system may be configured to implement the method steps, in any order, in other embodiments.

As shown, server 130 generates 602 a multi-scale representation of an image as input to a machine learning model. For example, server 130 uses scale factors of 0.5, 0.25, 1.25, 1.5, 1.75, and 2 to generate upscaled and downscaled versions of the image. One or more upscaled versions of the image are optionally divided into multiple subsets, and each subset is used as a separate input into the machine learning model to accommodate memory or other constraints associated with executing the machine learning model.

Next, server 130 performs 604 one or more operations that apply the machine learning model to the multi-scale representation of the image to produce a semantic segmentation containing predictions of labels for regions of pixels in the image. For example, the machine learning model includes a DLA architecture that includes a first intermediate layer that aggregates a first set of outputs of a set of deep layers, as well as a second intermediate layer that aggregates the output of the first intermediate layer with one or more additional layers in the machine learning model. Server 130 iteratively inputs each scaling of the image and/or each subset of an upscaled version of the image into the machine learning model, and the machine learning model outputs predictions of labels for individual pixels in the inputted scaling or subset of the image. Multiple versions of the outputted predictions for the multiple scalings are then converted into a common resolution (e.g., using downsampling, bilinear interpolation, and/or other techniques), and the converted predictions are aggregated (e.g., using an average, weighted average, and/or another formula) into the semantic segmentation.

Server 130 optionally applies one or more adjustments to the semantic segmentation. First, server 130 removes 606, from the semantic segmentation, a predicted label for a region of pixels in the image when the size of the region falls below a threshold. For example, server 130 removes the label of "car" from a region of pixels in the image when the region is smaller than a threshold, when the region is fully surrounded by a different label, and/or when the predicted probability of the label falls below a threshold.

Second, server 130 replaces 608, in the semantic segmentation, a first predicted label for a first region of pixels in the image with a second predicted label for a second region of pixels surrounding the first region of pixels in the image based on the first and/or second predicted labels. For example, server 130 replaces the first label for the first region with the second label when the second label is associated with high confidence in occupying a simply connected (i.e., without holes) region within the image.

Client device 102 outputs 610, in a user interface, the semantic segmentation for use in assisting a user in specifying the labels for the pixels in the image. For example, client device 102 receives the image and semantic segmentation from server 130. Client device 102 displays the image in the user interface and the semantic segmentation as colored, highlighted, and/or otherwise visually indicated regions within the displayed image. Client device 102 also, or instead, displays outlines associated with boundaries of the labels in the image.

Client device 102 receives 612, via the user interface, user input indicating locations of one or more labels of objects in the image, and client device 102 and/or server 130 perform 614 one or more additional operations on the locations of the label(s) to update the semantic segmentation. For example, client device 102 receives, from a user, a series of clicks representing corrections to the semantic segmentation. The corrections include, but are not limited to, clicks that add pixels or regions of pixels to a label and/or clicks that remove pixels or regions of pixels from a label. In turn, client device 102 and/or server 130 update the semantic segmentation to reflect the added or removed labels. Client device 102 and/or server 130 also, or instead, apply another machine learning model to the corrections to generate an updated semantic segmentation of the image.

Operations 610-614 may be repeated until labeling of the image is completed 616. For example, the latest version of the semantic segmentation is outputted in the user interface, and user input for specifying labels for pixels in the image is received via the user interface and used to update the semantic segmentation until all pixels in the image have been labeled and/or the user determines that the semantic segmentation is correct.

In sum, the disclosed embodiments expedite user labeling of pixels in an image with classes by generating "prelabels" representing a predicted semantic segmentation of the image. The accuracy or usefulness of the prelabels is improved by applying adjustments that remove and/or replace labels for certain regions within the image, and the prelabels are outputted with the images within a user interface to one or more users. The user(s) then interact with tools provided by the user interface to confirm, change, or remove labels for regions of pixels in the image; adjust the boundaries of the regions; add or remove regions of pixels in the image; and/or otherwise specify labels for pixels in the image.

By initializing pixels in the image with predictions of labels outputted by a machine learning model, the disclosed embodiments allow users to perform semantic segmentation of the image by confirming the labels or making corrections to the labels. As a result, the users are able to label pixels in the image more quickly than conventional techniques that require users to specify labels for all pixels in an image. Because the amount of user input or time required to label pixels in the image is reduced, processing time and/or resource consumption by servers, client devices, and/or applications that provide user interfaces or tools for performing user labeling of the image are also reduced. In turn, machine learning models that are trained or validated using the labels have better performance and/or faster convergence than machine learning models that are trained or validated using noisy and/or inaccurate labels. Consequently, the disclosed techniques provide technological improvements in the generation of labeled data for machine learning and/or the training, validation, and execution of machine learning models.

1. In some embodiments, a computer-implemented method for performing a labeling task comprises generating a multi-scale representation of an image as input to a machine learning model; performing one or more operations that apply the machine learning model to the multi-scale representation of the image to produce a semantic segmentation comprising predictions of labels for regions of pixels in the image; and outputting, in a user interface, the semantic segmentation for use in assisting a user in specifying the labels for the pixels in the image.

2. The computer-implemented method of clause 1, further comprising removing, from the semantic segmentation, a predicted label for a region of pixels in the image when a size of the region falls below a threshold.

3. The computer-implemented method of any of clauses 1-2, further comprising replacing, in the semantic segmentation, a first predicted label for a first region of pixels in the image with a second predicted label for a second region of pixels surrounding the first region of pixels in the image based on the first or second predicted labels.

4. The computer-implemented method of any of clauses 1-3, further comprising training the machine learning model based on a loss function comprising a first weight for a first pixel in an interior of an object and a second weight that is higher than the first weight for a second pixel in a boundary of the object.

5. The computer-implemented method of any of clauses 1-4, further comprising receiving, via the user interface, user input indicating locations of one or more of the labels of the objects in the image; and performing one or more additional operations on the locations of the one or more of the labels to update the semantic segmentation.

6. The computer-implemented method of any of clauses 1-5, wherein generating the multi-scale representation of the image comprises downscaling the image by a first set of scale factors to produce a set of downscaled versions of the image; and upscaling the image by a second set of scale factors to produce a set of upscaled versions of the image.

7. The computer-implemented method of any of clauses 1-6, wherein generating the multi-scale representation of the image further comprises dividing an upscaled version in the set of upscaled versions of the image into multiple subsets of the upscaled version.

8. The computer-implemented method of any of clauses 1-7, wherein the first set of scale factors comprises 0.5 and 0.25.

9. The computer-implemented method of any of clauses 1-8, wherein the second set of scale factors comprises 1.25, 1.5, 1.75, and 2.

10. The computer-implemented method of any of clauses 1-9, wherein performing the one or more operations that apply the machine learning model to the multi-scale representation of the image to produce the semantic segmentation comprises generating multiple versions of the predictions of the labels from multiple scalings of the image in the multi-scaled representation; converting the multiple versions of the predictions into a common resolution; and aggregating the converted multiple versions of the predictions into the semantic segmentation.

11. The computer-implemented method of any of clauses 1-10, wherein aggregating the converted multiple versions of the predictions into the semantic segmentation comprises generating the semantic segmentation as a weighted combination of the converted multiple versions of the predictions.

12. The computer-implemented method of any of clauses 1-11, wherein outputting the semantic segmentation comprises at least one of displaying an outline associated with a label on the image and visually indicating one or more regions of pixels in the image with the label.

13. The computer-implemented method of any of clauses 1-12, wherein the machine learning model comprises a first intermediate layer that aggregates a first set of outputs of a set of deep layers and a second intermediate layer that aggregates an output of the first intermediate layer with one or more additional layers in the machine learning model.

14. In some embodiments, a non-transitory computer readable medium stores instructions that, when executed by a processor, cause the processor to perform the steps of generating a multi-scale representation of an image as input to a machine learning model; performing one or more operations that apply the machine learning model to the multi-scale representation of the image to produce a semantic segmentation comprising predictions of labels for regions of pixels in the image; and outputting, in a user interface, the semantic segmentation for use in assisting a user in specifying the labels for the pixels in the image.

15. The non-transitory computer readable medium of clause 14, wherein the steps further comprise removing, from the semantic segmentation, a predicted label for a region of pixels in the image when a size of the region falls below a threshold.

16. The non-transitory computer readable medium of any of clauses 14-15, wherein the steps further comprise replacing, in the semantic segmentation, a first predicted label for a first region of pixels in the image with a second predicted label for a second region of pixels surrounding the first region of pixels in the image based on the first or second predicted labels.

17. The non-transitory computer readable medium of any of clauses 14-16, wherein the steps further comprise receiving, via the user interface, user input indicating locations of one or more of the labels of the objects in the image; and performing one or more additional operations on the locations of the one or more of the labels to update the semantic segmentation.

18. The non-transitory computer readable medium of any of clauses 14-17, wherein generating the multi-scale representation of the image comprises scaling the image by scale factors of 0.25, 0.5, 1.25, 1.5, 1.75, and 2.

19. The non-transitory computer readable medium of any of clauses 14-18, wherein performing the one or more operations that apply the machine learning model to the multi-scale representation of the image to produce the semantic segmentation comprises generating multiple versions of the predictions of the labels from multiple scaled images in the multi-scaled representation of the image; converting the multiple versions of the predictions into a common resolution; and aggregating the converted multiple versions of the predictions into the semantic segmentation.

20. In some embodiments, a system comprises a memory that stores instructions, and a processor that is coupled to the memory and, when executing the instructions, is configured to generate a multi-scale representation of an image as input to a first machine learning model; perform one or more operations that apply the first machine learning model to the multi-scale representation of the image to produce a semantic segmentation comprising predictions of labels for regions of pixels in the image; output, in a user interface, the semantic segmentation for use in assisting a user in specifying the labels for the pixels in the image; receive, via the user interface, user input indicating locations of one or more of the labels of the objects in the image; and perform one or more additional operations that apply a second machine learning model to the locations of the one or more of the labels to update the semantic segmentation.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for performing a labeling task, comprising:
   applying a first set of scale factors to an image to produce a set of downscaled versions of the image;
   applying a second set of scale factors to the image to produce a set of upscaled versions of the image;
   performing one or more operations that apply a machine learning model to the image, the set of downscaled versions of the image, and the set of upscaled versions of the image to produce a first set of predicted labels for a first set of pixels associated with the image, a second set of predicted labels for a second set of pixels associated with the set of downscaled versions of the image, and a third set of predicted labels for a third set of pixels associated with the set of upscaled versions of the image;
   generating a semantic segmentation that includes a fourth set of predicted labels for regions of pixels in the image based on an aggregation of the first set of predicted labels, the second set of predicted labels, and the third set of predicted labels; and
   outputting, in a user interface, the semantic segmentation for use in assisting a user in specifying updates to the fourth set of predicted labels for the pixels in the image.

2. The computer-implemented method of claim 1, further comprising removing, from the semantic segmentation, a predicted label for a region of pixels in the image when a size of the region falls below a threshold.

3. The computer-implemented method of claim 1, further comprising replacing, in the semantic segmentation, a first predicted label for a first region of pixels in the image with a second predicted label for a second region of pixels surrounding the first region of pixels in the image based on the first predicted label or the second predicted label.

4. The computer-implemented method of claim 1, further comprising training the machine learning model based on a loss function comprising a first weight for a first pixel in an interior of an object and a second weight that is higher than the first weight for a second pixel in a boundary of the object.

5. The computer-implemented method of claim 1, further comprising:
   receiving, via the user interface, user input indicating locations of one or more labels in the image; and
   performing one or more additional operations on the locations of the one or more labels to update the semantic segmentation.

6. The computer-implemented method of claim 1, wherein applying the second set of scale factors to the image to produce the set of upscaled versions of the image comprises dividing an upscaled version in the set of upscaled versions of the image into multiple subsets of the upscaled version.

7. The computer-implemented method of claim 1, wherein the first set of scale factors comprises 0.5 and 0.25.

8. The computer-implemented method of claim 1, wherein the second set of scale factors comprises 1.25, 1.5, 1.75, and 2.

9. The computer-implemented method of claim 1, wherein generating the semantic segmentation comprises:
   converting the first set of predicted labels, the second set of predicted labels, and the third set of predicted labels into a common resolution; and
   aggregating the converted first set of predicted labels, the converted second set of predicted labels, and the converted third set of predicted labels into the semantic segmentation.

10. The computer-implemented method of claim 9, wherein aggregating the converted first set of predicted labels, the converted second set of predicted labels, and the converted third set of predicted labels into the semantic segmentation comprises generating the semantic segmentation as a weighted combination of the converted first set of predicted labels, the converted second set of predicted labels, and the converted third set of predicted labels.

11. The computer-implemented method of claim 1, wherein outputting the semantic segmentation comprises at least one of displaying an outline associated with a label on the image or visually indicating one or more regions of pixels in the image with the label.

12. The computer-implemented method of claim 1, wherein the machine learning model comprises a first intermediate layer that aggregates a first set of outputs of a set of deep layers and a second intermediate layer that aggregates an output of the first intermediate layer with one or more additional layers in the machine learning model.

13. A non-transitory computer readable medium storing instructions that, when executed by a processor, cause the processor to perform the steps of:
applying a first set of scale factors to an image to produce a set of downscaled versions of the image;
applying a second set of scale factors to the image to produce a set of upscaled versions of the image;
performing one or more operations that apply a machine learning model to the image, the set of downscaled versions of the image, and the set of upscaled versions of the image to produce a first set of predicted labels for a first set of pixels associated with the image, a second set of predicted labels for a second set of pixels associated with the set of downscaled versions of the image, and a third set of predicted labels for a third set of pixels associated with the set of upscaled versions of the image;
generating a semantic segmentation that includes a fourth set of predicted labels for regions of pixels in the image based on an aggregation of the first set of predicted labels, the second set of predicted labels, and the third set of predicted labels; and
outputting, in a user interface, the semantic segmentation in association with the pixels in the image.

14. The non-transitory computer readable medium of claim 13, wherein the steps further comprise removing, from the semantic segmentation, a predicted label for a region of pixels in the image when a size of the region falls below a threshold.

15. The non-transitory computer readable medium of claim 13, wherein the steps further comprise replacing, in the semantic segmentation, a first predicted label for a first region of pixels in the image with a second predicted label for a second region of pixels surrounding the first region of pixels in the image based on the first predicted label or the second predicted label.

16. The non-transitory computer readable medium of claim 13, wherein the steps further comprise:
receiving, via the user interface, user input indicating locations of one or more labels in the image; and
performing one or more additional operations on the locations of the one or more labels to update the semantic segmentation.

17. The non-transitory computer readable medium of claim 13, wherein the first set of scale factors and the second set of scale factors include 0.25, 0.5, 1.25, 1.5, 1.75, and 2.

18. The non-transitory computer readable medium of claim 13, wherein generating the semantic segmentation comprises:
converting the first set of predicted labels, the second set of predicted labels, and the third set of predicted labels into a common resolution; and
aggregating the converted first set of predicted labels, the converted second set of predicted labels, and the converted third set of predicted labels into the semantic segmentation.

19. A system, comprising:
a memory that stores instructions, and
a processor that is coupled to the memory and, when executing the instructions, is configured to:
apply a first set of scale factors to an image to produce a set of downscaled versions of the image;
apply a second set of scale factors to the image to produce a set of upscaled versions of the image;
perform one or more operations that apply a machine learning model to the image, the set of downscaled versions of the image, and the set of upscaled versions of the image to produce a first set of predicted labels for a first set of pixels associated with the image, a second set of predicted labels for a second set of pixels associated with the set of downscaled versions of the image, and a third set of predicted labels for a third set of pixels associated with the set of upscaled versions of the image;
generate a semantic segmentation that includes a fourth set of predicted labels for regions of pixels in the image based on an aggregation of the first set of predicted labels, the second set of predicted labels, and the third set of predicted labels;
output, in a user interface, the semantic segmentation for use in assisting a user in specifying updates to the fourth set of predicted labels for the pixels in the image;
receive, via the user interface, user input indicating locations of one or more labels in the image; and
perform one or more additional operations that apply a second machine learning model to the locations of the one or more labels to update the semantic segmentation.

* * * * *